United States Patent
Niwa et al.

(10) Patent No.: US 11,319,470 B2
(45) Date of Patent: *May 3, 2022

(54) PRESSURE SENSITIVE ADHESIVE, CURABLE PRESSURE SENSITIVE ADHESIVE COMPOSITION, PRESSURE SENSITIVE ADHESIVE SHEET AND METHOD FOR MANUFACTURING THEREOF

(71) Applicant: NITTO DENKO CORPORATION, Ibaraki (JP)

(72) Inventors: Masahito Niwa, Ibaraki (JP); Itsuhiro Hatanaka, Ibaraki (JP); Taiki Shimokuri, Ibaraki (JP); Shou Takarada, Ibaraki (JP); Takahiro Nonaka, Ibaraki (JP); Keisuke Hirano, Ibaraki (JP); Fumika Kawatake, Ibaraki (JP); Mika Ikemura, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 354 days.

This patent is subject to a terminal disclaimer.

(21) Appl. No.: 16/260,563

(22) Filed: Jan. 29, 2019

(65) Prior Publication Data
US 2019/0233681 A1 Aug. 1, 2019

(30) Foreign Application Priority Data
Jan. 30, 2018 (JP) .............................. JP2018-014204

(51) Int. Cl.
*C09J 175/16* (2006.01)
*C09J 7/38* (2018.01)
(Continued)

(52) U.S. Cl.
CPC ........... *C09J 175/16* (2013.01); *C08F 220/10* (2013.01); *C09J 7/10* (2018.01); *C09J 7/20* (2018.01);
(Continued)

(58) Field of Classification Search
None
See application file for complete search history.

(56) References Cited

U.S. PATENT DOCUMENTS

| 2013/0005911 A1 | 1/2013 | Okamoto et al. | |
| 2013/0084416 A1* | 4/2013 | Nakanishi | C09J 7/385 428/40.1 |

(Continued)

FOREIGN PATENT DOCUMENTS

| CN | 102822296 A | 12/2012 |
| JP | 1-201052 A | 8/1989 |

(Continued)

OTHER PUBLICATIONS

Notice of Reason for Refusal dated Aug. 17, 2021 from the Japanese Patent Office in Application No. 2018-014204
(Continued)

*Primary Examiner* — Frank D Ducheneaux
(74) *Attorney, Agent, or Firm* — Sughrue Mion, PLLC

(57) ABSTRACT

A pressure sensitive adhesive includes an acryl-based base polymer. The acryl-based base polymer contains an acryl-based segment and a urethane-based segment. In the acryl-based base polymer, the content of the urethane-based segment is 3 to 20 parts by weight based on 100 parts by weight of the acryl-based segment. A pressure sensitive adhesive sheet can be obtained by applying a pressure sensitive adhesive composition on a substrate in a layer form. The pressure sensitive adhesive composition may be curable and may include a polymerization initiator. In for-
(Continued)

mation of the pressure sensitive adhesive sheet, the curable pressure sensitive adhesive composition may be, as necessary.

11 Claims, 1 Drawing Sheet

(51) Int. Cl.
| | |
|---|---|
| C09J 133/14 | (2006.01) |
| C09J 175/08 | (2006.01) |
| C09J 7/10 | (2018.01) |
| C09J 7/20 | (2018.01) |
| C09J 175/06 | (2006.01) |
| C09J 7/25 | (2018.01) |
| G06F 3/041 | (2006.01) |
| C08F 220/10 | (2006.01) |

(52) U.S. Cl.
CPC ............... *C09J 7/255* (2018.01); *C09J 7/38* (2018.01); *C09J 7/385* (2018.01); *C09J 133/14* (2013.01); *C09J 175/06* (2013.01); *C09J 175/08* (2013.01); *G06F 3/041* (2013.01); *C08G 2170/40* (2013.01); *C09J 2301/122* (2020.08); *C09J 2301/302* (2020.08); *C09J 2301/312* (2020.08); *C09J 2433/00* (2013.01); *C09J 2451/00* (2013.01); *C09J 2475/00* (2013.01)

(56) References Cited

U.S. PATENT DOCUMENTS

| | | |
|---|---|---|
| 2015/0056417 A1 | 2/2015 | Yamazaki et al. |
| 2015/0232707 A1 | 8/2015 | Yoon et al. |
| 2017/0152403 A1 | 6/2017 | Kanda |

FOREIGN PATENT DOCUMENTS

| | | |
|---|---|---|
| JP | 2006-104296 A | 4/2006 |
| JP | 2014-174179 A | 4/2014 |
| JP | 2014-152225 A | 8/2014 |
| JP | 2015-174907 A | 10/2015 |
| WO | 2013/161666 A1 | 10/2013 |
| WO | 2014/027788 A1 | 2/2014 |
| WO | 2016/002666 A1 | 1/2016 |

OTHER PUBLICATIONS

First Office Action dated Oct. 29, 2021 from the China National Intellectual Property Administration in CN Application No. 201910058330.9.

* cited by examiner

PRESSURE SENSITIVE ADHESIVE, CURABLE PRESSURE SENSITIVE ADHESIVE COMPOSITION, PRESSURE SENSITIVE ADHESIVE SHEET AND METHOD FOR MANUFACTURING THEREOF

CROSS-REFERENCE TO RELATED APPLICATIONS

This application claims priority to Japanese Patent Application No. 2018-014204 filed on Jan. 30, 2018; the entire content thereof is herein incorporated by reference.

TECHNICAL FIELD

The present disclosure relates to a pressure sensitive adhesive and a pressure sensitive adhesive sheet. The present disclosure also relates to a curable pressure sensitive adhesive composition applicable to preparation of a pressure sensitive adhesive sheet, and a method for manufacturing a pressure sensitive adhesive sheet using the pressure sensitive adhesive composition.

BACKGROUND

A pressure sensitive adhesive sheet is used in various situations such as connection, protection and decoration of articles. Typical examples of the pressure sensitive adhesive sheet include acryl-based pressure sensitive adhesive sheets formed of a pressure sensitive adhesive mainly composed of an acryl-based base polymer. The acryl-based pressure sensitive adhesive sheet exhibits moderate wettability, cohesiveness and pressure sensitive adhesive properties such as adhesiveness, and is excellent in weather resistance, heat resistance and the like.

In the acryl-based pressure sensitive adhesive, properties such as a glass transition temperature can be easily adjusted by changing the types and copolymerization ratios of constituent monomers. In the acryl-based pressure sensitive adhesive, adhesive properties etc. can be adjusted with the cohesive force increased by introducing a crosslinked structure into a base polymer. For example, when a polymer having a reactive functional group such as a hydroxyl group or carboxyl group on a side chain is reacted with a crosslinker such as an isocyanate or epoxy, a crosslinked structure can be introduced into the polymer. In addition, by using as a copolymerizable component a polyfunctional monomer or oligomer having two or more polymerizable functional groups per molecule, a polymer having a crosslinked structure is obtained. As the polyfunctional monomer or oligomer for introducing a crosslinked structure into an acryl-based polymer, a polyfunctional (meth)acrylate is generally used.

The shear storage elastic modulus is increased by enhancing cohesiveness of the pressure sensitive adhesive. With an increase in shear storage elastic modulus, the adhesion retaining force at a high temperature increases, so that peeling of a bonding portion tends to be suppressed even when a certain shear force is applied to a bonding member under a high-temperature environment. On the other hand, when the cohesiveness of the pressure sensitive adhesive is enhanced, viscidity tends to be reduced, so that adhesive strength in a low-temperature environment may be insufficient.

International Publication Nos. WO 2014/027788 and WO 2016/002666 each disclose a urethane-based pressure sensitive adhesive obtained by copolymerizing a urethane oligomer and an acryl-based monomer. In general, a urethane-based polymer has a glass transition temperature lower than that of an acryl-based polymer, and therefore a urethane-based pressure sensitive adhesive has an advantage that adhesiveness at a low temperature can be improved as compared to an acryl-based pressure sensitive adhesive.

SUMMARY

Since mobile terminals such as mobile phones and smart phones, automobiles, freezing and refrigeration equipment and so on are used over a wide temperature range from a low temperature to a high temperature, pressure sensitive adhesives to be used for connection and surface decoration of parts for these apparatuses are required to have both an excellent retaining force at a high temperature and favorable adhesiveness at a low temperature.

In the acryl-based pressure sensitive adhesive, adhesiveness at a low temperature tends to be improved by lowering the glass transition temperature of the polymer. The urethane-based pressure sensitive adhesive disclosed in Patent Documents 1 and 2 has a low glass transition temperature, and is thus excellent in adhesiveness at a low temperature. When the acryl-based pressure sensitive adhesive has a low glass transition temperature, the storage elastic modulus tends to decrease, leading to reduction of the adhesion retaining force at a high temperature. The urethane-based pressure sensitive adhesive having a low glass transition temperature has the same tendency as described above, and does not have a sufficient retaining force at a high temperature. That is, in conventional pressure sensitive adhesives, there is a certain correlation between the glass transition temperature and the shear storage elastic modulus, and it is not easy to have both adhesiveness at a low temperature and a retaining force at a high temperature.

In view of the above-described circumstances, it is required to provide a pressure sensitive adhesive that is able to have both adhesiveness at a low temperature and a retaining force at a high temperature, and a pressure sensitive adhesive sheet obtained by using the pressure sensitive adhesive.

Disclosed is a pressure sensitive adhesive containing an acryl-based base polymer. The acryl-based base polymer contains an acryl-based segment and a urethane-based segment. In the base polymer, a content of the urethane-based segment is 3 to 20 parts by weight based on 100 parts by weight of the acryl-based segment.

The pressure sensitive adhesive can satisfy both a low glass transition temperature and a high storage elastic modulus because a base polymer includes an acryl-based segment and a urethane-based segment at a specific ratio. Thus, the pressure sensitive adhesive sheet disclosed herein may be excellent in adhesiveness at a low temperature and adhesion retaining force at a high temperature, so that adhesion with high reliability can be attained over a wide temperature range.

A weight average molecular weight of the urethane-based segment is preferably 3000 to 50000. A glass transition temperature of the urethane-based segment is preferably 0° C. or lower.

As the urethane-based segment, one having a polyether chain, a polyester chain, a polycarbonate chain or the like is preferably used. The urethane-based segment having a polyether chain may be obtained by reaction of a polyether polyol with an isocyanate. The urethane-based segment having a polyester chain may be obtained by reaction of a polyester polyol with an isocyanate. The urethane-based segment having a polycarbonate chain may be obtained by reaction of a polycarbonate polyol with an isocyanate.

In the base polymer, the acryl-based segment and the urethane-based segment are covalently bonded to each other. In one embodiment, the acryl-based base polymer has a structure in which an acryl-based segment is crosslinked with a urethane-based segment. A polymer in which an acryl-based segment is crosslinked with a urethane-based segment is obtained by, for example, copolymerization of a monomer component for forming the acryl-based segment and a urethane (meth)acrylate having (meth)acryloyl groups at two or more terminals.

Preferably, the pressure sensitive adhesive contains 50% by weight or more of the base polymer. The pressure sensitive adhesive may contain a component other than the base polymer. For example, the pressure sensitive adhesive may contain an acryl-based oligomer having a weight average molecular weight of 1000 to 30000. A glass transition temperature of the pressure sensitive adhesive is preferably −25° C. to 0° C.

The pressure sensitive adhesive may be formed by curing a curable pressure sensitive adhesive composition by photocuring, thermal curing, etc. In one embodiment, the curable pressure sensitive adhesive composition contains an acryl-based monomer and/or a partially polymerized product of the acryl-based monomer (acryl-based prepolymer composition), and a urethane (meth)acrylate having two or more (meth)acryloyl groups. When the pressure sensitive adhesive composition is cured, polymerization of the acryl-based monomer and the urethane (meth)acrylate contained in the prepolymer composition proceeds, so that a base polymer is obtained in which a crosslinked structure is introduced into an acryl-based segment by a urethane-based segment.

A content of the urethane (meth)acrylate is preferably 3 to 20 parts by weight based on 100 parts by weight of a total of the acryl-based monomer and partially polymerized product of the acryl-based monomer. A weight average molecular weight of the urethane (meth)acrylate is preferably 3000 to 50000. A glass transition temperature of the urethane (meth)acrylate is preferably 0° C. or lower.

A total content of the acryl-based monomer and partially polymerized product of the acryl-based monomer in the pressure sensitive adhesive composition is preferably 50% by weight or more. The pressure sensitive adhesive composition may contain a component other than the acryl-based monomer and partially polymerized product of the acryl-based monomer and the urethane (meth)acrylate. The pressure sensitive adhesive composition may contain an acryl-based oligomer having a weight average molecular weight of 1000 to 30000. The pressure sensitive adhesive composition may contain a photopolymerization initiator and/or a thermopolymerization initiator. The pressure sensitive adhesive composition is preferably a photocurable pressure sensitive adhesive composition containing a photopolymerization initiator.

Also disclosed is a pressure sensitive adhesive sheet obtained by depositing the pressure sensitive adhesive in a form of a sheet. The pressure sensitive adhesive sheet can be formed by, for example, applying the curable pressure sensitive adhesive composition in a layer form on a substrate, and curing the pressure sensitive adhesive composition. The method for curing the pressure sensitive adhesive composition is preferably photocuring or thermal curing.

DETAILED DESCRIPTION OF PREFERRED EMBODIMENTS

[Base Polymer]

Figure 1:
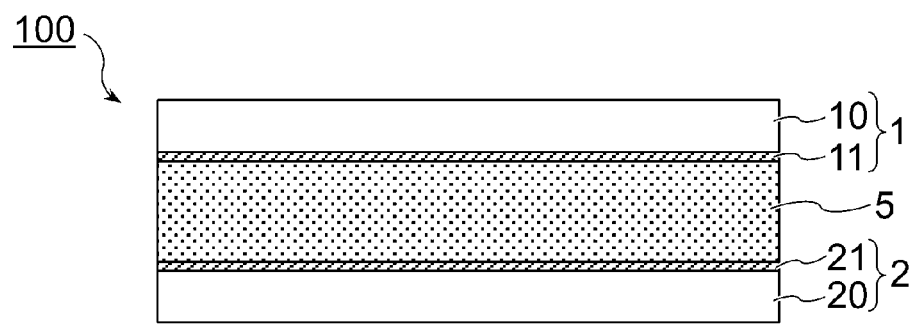
FIG. 1 is a sectional view showing an example of a configuration of a release film-equipped pressure sensitive adhesive sheet.

The pressure sensitive adhesive contains a base polymer containing an acryl-based segment and a urethane-based segment. The content of the urethane-based segment in the base polymer is 3 to 20 parts by weight, preferably 4 to 17 parts by weight, more preferably 5 to 15 parts by weight based on 100 parts by weight of the acryl-based segment. Since the base polymer contains the acryl-based segment and the urethane-based segment, the glass transition temperature can be lowered to improve adhesiveness at a low temperature without impairing the adhesion retaining force of the acryl-based polymer at a high temperature.

The acryl-based segment and the urethane-based segment in the base polymer are covalently bonded to each other. Examples of the polymer in which an acryl-based segment and a urethane-based segment are covalently bonded to each other include: block polymers in which both segments form a main skeleton; graft polymers in which one segment forms a main skeleton, and the other segment is bonded to the main skeleton and forms a side chain; and crosslinked polymers in which one segment crosslinks the other segment. The graft polymer and the crosslinked polymer are each preferably one in which the acryl-based segment is a main skeleton, and the urethane-based segment as a side chain or a crosslinking component is chemically bonded to the acryl-based segment (acryl-based polymer chain) as a main skeleton.

<Acryl-Based Segment>

The acryl-based segment contains a (meth)acrylic acid alkyl ester as a main constituent monomer component. In this specification, the "(meth)acryl" means acryl and/or methacryl.

As the (meth)acrylic acid alkyl ester, a (meth)acrylic acid alkyl ester with the alkyl group having 1 to 20 carbon atoms is preferably used. The alkyl group of the (meth)acrylic acid alkyl ester may have a branch or may have a cyclic alkyl group.

Specific examples of the (meth)acrylic acid alkyl ester having a linear or branched alkyl group include methyl (meth)acrylate, ethyl (meth)acrylate, butyl (meth)acrylate, isobutyl (meth)acrylate, s-butyl (meth)acrylate, t-butyl (meth)acrylate, pentyl (meth)acrylate, isopentyl (meth)acrylate, neopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, isotridodecyl (meth)acrylate, tetradecyl (meth)acrylate, isotetradecyl (meth)acrylate, pentadecyl (meth)acrylate, cetyl (meth)acrylate, heptadecyl (meth)acrylate, octadecyl (meth)acrylate, isooctadecyl (meth)acrylate and nonadecyl (meth)acrylate.

Specific examples of the (meth)acrylic acid alkyl ester having a cycloaliphatic alkyl group include (meth)acrylic acid cycloalkyl esters such as cyclopentyl (meth)acrylate, cyclohexyl (meth)acrylate, cycloheptyl (meth)acrylate and cyclooctyl (meth)acrylate; (meth)acrylic acid esters having a dicyclic aliphatic hydrocarbon ring, such as isobornyl (meth)acrylate; and (meth)acrylic acid esters having a tri-or-more-cyclic aliphatic hydrocarbon ring, such as dicyclopentanyl (meth)acrylate, dicyclopentanyloxyethyl (meth)acrylate, tricyclopentanyl (meth)acrylate, 1-adamantyl (meth)acrylate, 2-methyl-2-adamantyl (meth)acrylate and 2-ethyl-2-adamantyl (meth)acrylate.

The amount of the (meth)acrylic acid alkyl ester based on the total amount of monomer components for forming an acryl-based segment is preferably 50% by weight or more, more preferably 60% by weight or more, further preferably 70% by weight or more. From the viewpoint of ensuring that the glass transition temperature (Tg) of the polymer chain is within an appropriate range, the amount of the (meth)acrylic acid alkyl ester having a linear or branched alkyl group having 4 to 10 carbon atoms based on the total amount of constituent monomer components in the acryl-based segment is preferably 30% by weight or more, more preferably 40% by weight or more, further preferably 50% by weight or more.

The constituent components of the urethane-based segment (e.g., urethane (meth)acrylate) are not included in monomer components for forming the acryl-based segment. The same applies to a case where a main skeleton structure includes a terminal functional group of a urethane-based segment in a graft polymer having a urethane-based graft side chain with an acryl-based segment as a main skeleton, or a crosslinked polymer in which an acryl-based segment is crosslinked with a urethane-based segment.

The acryl-based segment may contain a hydroxyl group-containing monomer and a carboxy group-containing monomer as constituent monomer components.

Examples of the hydroxyl group-containing monomer include (meth)acrylic acid esters such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate and (4-hydroxymethylcyclohexyl)-methyl (meth)acrylate. Examples of the carboxy group-containing monomer include acryl-based monomers such as (meth)acrylic acid, carboxyethyl (meth)acrylate and carboxypentyl (meth)acrylate, and unsaturated fatty acids such as itaconic acid, maleic acid, fumaric acid and crotonic acid.

The acryl-based segment may contain a nitrogen-containing monomer as the constituent monomer component. Examples of the nitrogen-containing monomer include vinyl-based monomer such as N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, (meth)acryloylmorpholine, N-vinylcarboxylic acid amides and N-vinylcaprolactam; and cyanoacrylate-based polymer such as acrylonitrile and methacrylonitrile.

When the acryl-based segment contains high-polarity monomers such as a hydroxyl group-containing monomer and a carboxy group-containing monomer as constituent monomer components, the cohesive force of the pressure sensitive adhesive tends to be enhanced, leading to improvement of adhesion retainability at a high temperature. The amount of high-polarity monomers (total of a hydroxyl group-containing monomer, a carboxy group-containing monomer and a nitrogen-containing monomer) based on the total amount of monomer components for forming the acryl-based segment is preferably 1 to 45% by weight, more preferably 5 to 40% by weight, further preferably 10 to 35% by weight.

Besides the above-described monomer components, the acryl-based segment may contain other monomer components. Examples of the monomer components include: vinyl-based monomers such as acid anhydride group-containing monomers, caprolactone adducts of acrylic acids, sulfonic acid group-containing monomers, phosphoric acid group-containing monomers, styrene and α-methylstyrene; cyanoacrylate-based monomers such as acrylonitrile and methacrylonitrile; epoxy group-containing monomers such as glycidyl (meth)acrylate; glycol-based acryl ester monomers such as polyethylene glycol (meth)acrylate, polypropylene glycol (meth)acrylate, methoxyethylene glycol (meth)acrylate and methoxypolypropylene glycol (meth)acrylate; and acrylic acid ester-based monomers such as tetrahydrofurfuryl (meth)acrylate, fluorine (meth)acrylate, silicone (meth)acrylate and 2-methoxyethyl (meth)acrylate.

The acryl-based segment may contain polyfunctional compound (monomer or oligomer). The polyfunctional compound includes at least two polymerizable functional groups each having an unsaturated double bond, such as (meth)acryloyl group and vinyl group, per molecule. Examples of the polyfunctional compound include polyethylene glycol di(meth)acrylate, polypropylene glycol di(meth)acrylate, polytetramethylene glycol di(meth)acrylate, bisphenol A ethylene oxide-modified di(meth)acrylate, bisphenol A propylene oxide-modified (meth)acrylate, alkanediol di(meth)acrylate, tricyclodecane dimethanol di(meth)acrylate, ethoxylated isocyanuric acid triacrylate, pentaerythritol tri(meth)acrylate, pentaerythritol di(meth)acrylate, trimethylolpropane tri(meth)acrylate, ditrimethylolpropane tetra(meth)acrylate, ethoxylated pentaerythritol tetra(meth)acrylate, pentaerythritol tetra(meth)acrylate, dipentaerythritol poly(meth)acrylate, dipentaerythritol hexa (meth)acrylate, neopentyl glycol di(meth)acrylate, glycerin di(meth)acrylate, epoxy (meth)acrylate, butadiene (meth)acrylate and isoprene (meth)acrylate.

When the acryl-based segment contains a polyfunctional monomer as a constituent monomer component, a branched structure (crosslinked structure) is introduced into the polymer chain. As described later, a crosslinked structure is introduced into the acryl-based segment by the urethane-based segment in the pressure sensitive adhesive according to one embodiment. In a base polymer having a crosslinked structure, increase of an amount of the crosslinked structure introduced by polyfunctional monomer components other than the urethane-based segment may lead to reduction of the low-temperature adhesive strength of the pressure sensitive adhesive. Thus, the amount of polyfunctional compounds based on the total amount of monomer components for forming the acryl-based segment is preferably 3% by weight or less, more preferably 1% by weight or less, further preferably 0.5% by weight or less, especially preferably 0.3% by weight or less.

From the viewpoint of lowering the glass transition temperature of the base polymer to obtain a pressure sensitive adhesive excellent in adhesiveness at a low temperature, the glass transition temperature of the acryl-based segment is preferably 0° C. or lower. On the other hand, from the viewpoint of increasing the adhesion retaining force at a high temperature, the glass transition temperature of the acryl-based segment is preferably −30° C. or higher, more preferably −20° C. or higher, further preferably −10° C. or higher. The glass transition temperature (Tg) of the acryl-based segment is determined from a loss tangent (tan δ) peak-top temperature in measurement of the dynamic viscoelasticity (frequency: 1 Hz) of a polymer obtained by polymerizing a monomer component for forming the acryl-based segment.

In a base polymer in which an acryl-based segment and a urethane-based segment are bonded to each other, it is difficult to measure the glass transition temperature of the acryl-based segment alone, and therefore evaluation may be performed on the basis of a theoretical glass transition temperature (Tg). The theoretical glass transition temperature (Tg) is calculated from the glass transition temperature (Tg) of a homopolymer of a constituent monomer component in the acryl-based segment and the weight fraction (W) of each monomer component in accordance with the following Fox equation:

$$1/Tg = \Sigma(W_i/Tg_i).$$

Tg represents a theoretical glass transition temperature (unit: K) of the polymer chain, $W_i$ represents a weight fraction (copolymerization ratio on a weight basis) of a monomer component i forming the segment, and $Tg_i$ represents a glass transition temperature (unit: K) of a homopolymer of the monomer component i. As the glass transition temperature of the homopolymer, the value described in Polymer Handbook, 3rd edition (John Wiley & Sons, Inc., 1989) can be referred. As the glass transition temperature (Tg) of a homopolymer of a monomer which is not described in the document, a loss tangent (tan δ) peak-top temperature obtained by dynamic viscoelasticity measurement may be employed.

From the viewpoint of lowering the glass transition temperature of the base polymer to obtain a pressure sensitive adhesive excellent in adhesiveness at a low temperature, the theoretical glass transition temperature (Tg) of the acryl-based segment is preferably 5° C. or lower, more preferably 0° C. or lower. On the other hand, from the viewpoint of increasing the adhesion retaining force at a high temperature, the theoretical glass transition temperature (Tg) of the acryl-based segment is preferably −50° C. or higher, more preferably −40° C. or higher, further preferably −20° C. or higher.

<Urethane-Based Segment>

The urethane-based segment is a molecular chain having a urethane bond. The urethane-based segment typically includes a polyurethane chain obtained by reacting diol and diisocyanate. From the viewpoint of obtaining a pressure sensitive adhesive that can have both adhesiveness at a low temperature and a retaining force at a high temperature, the molecular weight of the polyurethane chain in the urethane-based segment is preferably 3000 to 50000, more preferably 4000 to 40000, further preferably 5000 to 30000.

Examples of the diol to be used for formation of the polyurethane chain include low-molecular-weight diols such as ethylene glycol, diethylene glycol, propylene glycol, butylene glycol and hexamethylene glycol; and high-molecular-weight polyols such as polyester polyol, polyether polyol, polycarbonate polyol, acryl polyol, epoxy polyol and caprolactone polyol.

The polyester polyol is polyester having a hydroxyl group at the terminal, and is obtained by reacting a polybasic acid with a polyhydric alcohol in such a manner that the alcohol equivalent is in surplus over the carboxylic acid equivalent. As a polybasic acid component and a polyhydric alcohol component which form the polyester polyol, a combination of a dibasic acid a diol is preferable.

Examples of the dibasic acid component include aromatic dicarboxylic acids such as orthophthalic acid, isophthalic acid and terephthalic acid; cycloaliphatic dicarboxylic acids such as hexahydrophthalic acid, tetrahydrophthalic acid, 1,3-cyclohexanedicarboxylic acid and 1,4-cyclohexanedicarboxylic acid; aliphatic dicarboxylic acids such as oxalic acid, succinic acid, malonic acid, glutaric acid, adipic acid, pimelic acid, suberic acid, azelaic acid, sebacic acid, decanedicarboxylic acid, dodecanedicarboxylic acid and octadecanedicarboxylic acid; and acid anhydrides and lower alcohol esters of these dicarboxylic acids.

Examples of the diol component include ethylene glycol, 1,2-propanediol, 1,3-propanediol, 1,3-butanediol, 1,4-butanediol, neopentyl glycol, pentanediol, 1,6-hexanediol, 1,8-octanediol, 1,10-decanediol, diethylene glycol, triethylene glycol, polyethylene glycol, dipropylene glycol, polypropylene glycol, 1,4-cyclohexanedimethanol, 1,4-cyclohexanediol, bisphenol A, bisphenol F, hydrogenated bisphenol A and hydrogenated bisphenol F.

The polyether polyol is obtained by ring-opening and addition polymerization of an alkylene oxide with a polyhydric alcohol. Examples of the alkylene oxide include ethylene oxide, propylene oxide, butylene oxide, styrene oxide and tetrahydrofuran. Examples of the polyhydric alcohol include the above-described diols, glycerin and trimethylolpropane.

Examples of the polycarbonate polyol include polycarbonate polyols obtained by subjecting a diol component and phosgene to polycondensation reaction; polycarbonate polyols obtained by subjecting a diol component and a carbonic acid diester such as dimethyl carbonate, diethyl carbonate, dipropyl carbonate, diisopropyl carbonate, dibutyl carbonate, ethylbutyl carbonate, ethylene carbonate, propylene carbonate, diphenyl carbonate or dibenzyl carbonate to transesterification condensation; copolymerized polycarbonate polyols obtained using two or more polyol components; polycarbonate polyols obtained by subjecting the above-mentioned various polycarbonate polyols and a carboxy group-containing compound to esterification reaction; polycarbonate polyols obtained by subjecting the above-mentioned various polycarbonate polyols and a hydroxyl group-containing compound to etherification reaction; polycarbonate polyols obtained by subjecting the above-mentioned various polycarbonate polyols and an ester compound to transesterification reaction; polycarbonate polyols obtained by subjecting the above-mentioned various polycarbonate polyols and a hydroxyl group containing compound to transesterification reaction; polyester-based polycarbonate polyols obtained by polycondensation of the above-mentioned various polycarbonate polyols and a dicarboxylic acid compound; and copolymerized polyether-based polycarbonate polyols obtained by copolymerizing the above-mentioned various polycarbonate polyols and an alkylene oxide.

The polyacryl polyol is obtained by copolymerizing a (meth)acrylic acid ester and a monomer component having a hydroxyl group. Examples of the monomer having a hydroxyl group include (meth)acrylic acid hydroxyalkyl esters such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate and 2-hydroxypentyl (meth)acrylate; polyhydric alcohol (meth)acrylic acid monoesters such as glycerin and trimethylolpropane; and N-methylol (meth)acrylamide. Examples of the (meth)acrylic acid ester include methyl (meth)acrylate, butyl (meth)acrylate, 2-ethylhexyl (meth)acrylate and cyclohexyl (meth)acrylate.

The polyacryl polyol may contain as a copolymerizable component a monomer component other than the components described above. Examples of the copolymerizable monomer component other than the components described above include unsaturated monocarboxylic acids such as (meth)acrylic acid; unsaturated dicarboxylic acids such as maleic acid, and anhydrides and mono- or diesters thereof; unsaturated nitriles such as (meth)acrylonitrile; unsaturated amides such as (meth)acrylamide and N-methylol (meth)

acrylamide; vinyl esters such as vinyl acetate and vinyl propionate; vinyl ethers such as methylvinyl ether; α-olefins such as ethylene and propylene; halogenated α,β-unsaturated aliphatic monomers such as vinyl chloride and vinylidene chloride; and α,β-unsaturated aromatic monomers such as styrene and α-methylstyrene.

The diisocyanate to be used for formation of the polyurethane chain may be either an aromatic or aliphatic diisocyanate. Examples of the aromatic diisocyanate include 1,5-naphthalene diisocyanate, 4,4'-diphenylmethane diisocyanate (MDI), 4,4'-diphenyldimethylmethane diisocyanate, tetramethyldiphenylmethane diisocyanate, 1,3-phenylene diisocyanate, 1,4-phenylene diisocyanate, 2-chloro-1,4-phenyl diisocyanate, 2,4-tolylene diisocyanate, 2,6-tolylene diisocyanate, xylylene diisocyanate, 4,4'-diphenyl ether diisocyanate, 4,4'-diphenylsulfoxide diisocyanate, 4,4'-diphenylsulfone diisocyanate and 4,4'-biphenyl diisocyanate. Examples of the aliphatic diisocyanate include butane-1,4-diisocyanate, hexamethylene diisocyanate, 2,2,4-trimethylhexamethylene diisocyanate, 2,4,4-trimethylhexamethylene diisocyanate, cyclohexane-1,4-diisocyanate, isophorone diisocyanate, dicyclohexylmethane-4,4'-diisocyanate, 1,3-bis(isocyanatemethyl)cydohexane and methylcyclohexane diisocyanate.

As the diisocyanate, a derivative of an isocyanate compound can also be used. Examples of the derivative of an isocyanate compound include dimers of polyisocyanate, trimers of isocyanate (isocyanurates), polymeric MDI, adducts with trimethylolpropane, biuret modified products, allophanate modified products and urea modified products.

As the diisocyanate component, a urethane prepolymer having an isocyanate group at the terminal may be used. By reacting a polyhydric alcohol with a polyisocyanate compound in such a manner that the polyisocyanate compound is in surplus, a urethane prepolymer having an isocyanate group at the terminal is obtained.

When a functional group chemically bondable to an acryl-based segment is introduced to a terminal of a polyurethane chain, a covalent bond can be formed between the urethane-based segment and the acryl-based segment. For example, when a polyurethane chain having a functional group chemically bondable to a terminal of an acryl-based segment is used, a block polymer having an acryl-based segment and a urethane-based segment is obtained. When a compound having a specific functional group at one terminal of a polyurethane chain is used, a graft polymer is obtained in which a urethane-based segment is bonded as a side chain to an acryl-based segment (acryl-based polymer chain as a main skeleton). When a compound having a specific functional group at each terminal (when the polyurethane chain has at least one branch, two or more of terminals) of a polyurethane chain is used, a crosslinked structure can be introduced into the acryl-based segment by a urethane-based segment. The specific functional group contained at the terminal the polyurethane chain may be a functional group copolymerizable with a monomer component for forming an acryl-based segment, or a functional group capable of reacting with a carboxy group, a hydroxyl group or the like contained in a side chain of an acryl-based segment.

For obtaining an acryl-based base polymer in which a crosslinked structure is introduced by a urethane-based segment, it is preferable to use a compound having a (meth)acryloyl group at both terminals of a urethane chain. For example, by copolymerizing a monomer component for forming an acryl-based segment and a urethane di(meth) acrylate having a (meth)acryloyl group at both terminals, a crosslinked structure can be introduced into an acryl-based segment by a urethane-based segment. The urethane (meth) acrylate has an advantage that it is excellent in compatibility with an acryl-based monomer and an acryl-based polymer chain, so that it is easy to uniformly introduce crosslinking points into the acryl-based segment.

The urethane di(meth)acrylate having a (meth)acryloyl group at both terminals is obtained by, for example, using a (meth)acrylic compound having a hydroxyl group, in addition to a diol component, in polymerization of polyurethane. From the viewpoint of controlling the chain length (molecular weight) of the urethane-based segment, it is preferable that an isocyanate-terminated polyurethane is synthesized by reacting a diol with a diisocyanate in such a manner that the isocyanate is in surplus, and a (meth)acrylic compound having a hydroxyl group is then added to react the isocyanate group at the terminal of the polyurethane with a hydroxyl group of the (meth)acrylic compound.

Examples of the (meth)acrylic compound having a hydroxyl group include hydroxyethyl (meth)acrylate, hydroxypropyl (meth)acrylate, hydroxybutyl (meth)acrylate, hydroxyhexyl (meth)acrylate, hydroxymethyl acrylamide and hydroxyethyl acrylamide.

For obtaining an isocyanate-terminated polyurethane, a diol component and a diisocyanate component may be used in such a manner that the NCO/OH ratio (equivalent ratio) is preferably 1.1 to 2.0, more preferably 1.15 to 1.5. A diol component and a diisocyanate component may be mixed in substantially equal amounts and reacted, followed by adding a diisocyanate component.

As the urethane (meth)acrylate, a commercially available product from a company such as Arakawa Chemical Industries, Ltd., Shin-Nakamura Chemical Co., Ltd., Toagosei Co., Ltd., Kyoeisha Chemical Co., Ltd., Nippon Kayaku Co., Ltd., The Nippon Synthetic Chemical Industry Co., Ltd., Negami Chemical Industrial Co., Ltd., Daicel-Allnex Ltd may be used. The weight average molecular weight of the urethane (meth)acrylate is preferably 3000 to 50000, more preferably 4000 to 40000, further preferably 5000 to 30000.

The glass transition temperature of the urethane (meth) acrylate is preferably 0° C. or lower, more preferably −10° C. or lower, further preferably −30° C. or lower, especially preferably −40° C. or lower. By using a urethane (meth) acrylate having a low glass transition temperature (Tg), a pressure sensitive adhesive excellent in adhesive strength at a low temperature even when a crosslinked structure is introduced by a urethane-based segment to enhance the cohesive force of the base polymer. The lower limit of the glass transition temperature of the urethane (meth)acrylate is not particularly limited, but is preferably −100° C. or higher, more preferably −80° C. or higher, further preferably −60° C. or higher from the viewpoint of obtaining a pressure sensitive adhesive excellent in retaining force at a high temperature.

When a crosslinked structure is introduced into the acryl-based segment by a urethane-based segment using a polyfunctional urethane (meth)acrylate such as urethane di(meth)acrylate, the glass transition temperature of the urethane-based segment of the base polymer is substantially equal to the glass transition temperature of the urethane (meth)acrylate.

<Preparation of Base Polymer>

A polymer having an acryl-based segment and a urethane-based segment can be polymerized by various known methods. A polyfunctional urethane (meth)acrylate such as a urethane di(meth)acrylate is used as a constituent component of a urethane-based segment, and a monomer component for forming an acryl-based segment and the urethane (meth)acrylate are copolymerized to obtain an acryl-based polymer in which a crosslinked structure is introduced into an acryl-based segment by a urethane-based segment.

The amount of the urethane (meth)acrylate is preferably 3 to 20 parts by weight, more preferably 4 to 25 parts by weight, further preferably 5 to 20 parts by weight based on 100 parts by weight of the monomer component for forming the acryl-based segment. When the amount of the urethane (meth)acrylate is within the above range, it is possible to prepare a base polymer in which the content of a urethane-based segment is within the above-mentioned range. When the content of the urethane-based segment is excessively low, the high-temperature retaining force of the pressure sensitive adhesive tends to be reduced due to reduction of cohesiveness of the base polymer. When the content of the urethane-based segment is excessively high, the viscidity of the pressure sensitive adhesive tends to be reduced due to an increase in cohesiveness of the base polymer, leading to deterioration of adhesiveness at a low temperature.

Examples of the polymerization method include solution polymerization, photopolymerization, block polymerization and emulsion polymerization. Solution polymerization or photopolymerization is preferable because of high reaction efficiency in radical polymerization. As a solvent for solution polymerization, ethyl acetate, toluene, etc. may be used.

A polymerization initiator such as a photopolymerization initiator or a thermopolymerization initiator may be used according to the type of polymerization reaction. Examples of the photopolymerization initiator include benzoin ether-based photopolymerization initiators, acetophenone-based photopolymerization initiators, α-ketol-based photopolymerization initiators, aromatic sulfonyl chloride-based photopolymerization initiators, photoactive oxime-based photopolymerization initiators, benzoin-based photopolymerization initiators, benzyl-based photopolymerization initiators, benzophenone-based photopolymerization initiators, ketal-based photopolymerization initiators, thioxanthone-based photopolymerization initiators and acylphosphine oxide-based photopolymerization initiators. Examples of the thermopolymerization initiator include an azo-based initiator, a peroxide-based initiator, a redox-based initiator obtained by combining a peroxide with a reducing agent (e.g., a combination of a persulfate with sodium hydrogen sulfite or a combination of a peroxide with sodium ascorbate).

In polymerization, a chain-transfer agent, a polymerization inhibitor (polymerization-delaying agent) or the like may be used for the purpose of, for example, adjusting the molecular weight. Examples of the chain-transfer agent include thiols such as α-thioglycerol, lauryl mercaptan, glycidyl mercaptan, mercaptoacetic acid, 2-mercaptoethanol, thioglycolic acid, 2-ethylhexyl thioglycolate and 2,3-dimercapto-1-propanol, and α-methylstyrene dimers.

In preparation of the base polymer, a monomer component for forming the acryl-based segment and a constituent component of the urethane segment (e.g., urethane (meth)acrylate) may be fully reacted at once, or polymerized in multiple stages according to, for example, the bonding form of the acryl-based segment and the urethane-based segment. For obtaining a polymer in which a crosslinked structure is introduced into an acryl-based segment by a urethane-based segment through polymerization in multiple stages, a method is preferable in which a monofunctional monomer for forming an acryl-based segment are polymerized to form a prepolymer composition (prepolymerization), and a polyfunctional compound such as a urethane di(meth)acrylate is added in a syrup of the prepolymer composition to polymerize the prepolymer composition and the polyfunctional monomer (postpolymerization). The prepolymer composition is a partially polymerized product containing a polymerized product with a low polymerization ratio and an unreacted monomer.

By performing prepolymerization of a constituent component of the acryl-based polymer, branch points (crosslinking points) with a polyfunctional compound such as a urethane di(meth)acrylate can be uniformly introduced into the acryl-based segment. In addition, the pressure sensitive adhesive sheet can also be formed by applying a mixture of a low-molecular-weight polymer or a partially polymerized product and an unpolymerized monomer component (pressure sensitive adhesive composition) onto a substrate, and then performing postpolymerization on the substrate.

A low-polymerization composition such as a prepolymer composition has a low viscosity, and is thus excellent in application property, and therefore by using a method in which a pressure sensitive adhesive composition that is a mixture of a prepolymer composition and a polyfunctional compound is applied, and then postpolymerization is performed on a substrate, productivity of the pressure sensitive adhesive sheet can be improved, and the thickness of the pressure sensitive adhesive sheet can be made uniform.

The prepolymer composition can be prepared by, for example, partially polymerizing (prepolymerization) a composition obtained by mixing a monomer component for forming the acryl-based segment and a polymerization initiator (so called "prepolymer forming composition"). The prepolymer forming composition may contain a polyfunctional compound (polyfunctional monomer or polyfunctional oligomer). For example, a part of the polyfunctional compound as a raw material for the polymer is included in the prepolymer forming composition, and after polymerization of the prepolymer, the remainder of the polyfunctional compound is added, and subjected to postpolymerization.

The prepolymer forming composition may contain a chain-transfer agent etc. as necessary in addition to the monomer and the polymerization initiator. Although the method for polymerizing a prepolymer is not particularly limited, photopolymerization is preferable because the molecular weight (polymerization ratio) of the prepolymer is easily adjusted. The polymerization initiator and the chain-transfer agent which are used in prepolymerization are not particularly limited, and the above-mentioned photopolymerization initiators and chain-transfer agents can be used.

Although the polymerization ratio of the prepolymer is not particularly limited, the polymerization ratio is preferably 3 to 50% by weight, more preferably 5 to 40% by weight from the viewpoint of obtaining a viscosity suitable for application of the prepolymer onto a substrate. The polymerization ratio of the prepolymer can be adjusted to fall within a desired range by adjusting the type and amount of the photopolymerization initiator, the irradiation intensity and irradiation time of an active ray such as UV light, and so on. The polymerization ratio of the prepolymer is calculated in accordance with the following expression from weights before and after the prepolymer composition is heated at 130° C. for 3 hours. When prepolymerization is performed by solution polymerization, the polymerization ratio is calculated in accordance with the following expression where the weight before drying is a weight obtained by subtracting the amount of the solvent from the total weight of the prepolymer composition.

polymerization ratio of prepolymer (%)=weight after drying/weight before drying×100

A polyfunctional urethane (meth)acrylate, and the remainder of a monomer component for forming the acryl-based segment, a polymerization initiator, a chain-transfer agent, other additives and so on as necessary are mixed with the prepolymer composition to prepare a curable pressure sensitive adhesive composition, and postpolymerization is then performed to obtain a base polymer in which a crosslinked structure is introduced into an acryl-based segment by a urethane-based segment.

The polymerization initiator and the chain-transfer agent to be used for postpolymerization are not particularly limited, and for example, the above-mentioned photopolymerization initiators and chain-transfer agents may be used. When the polymerization initiator in prepolymerization is not deactivated and remains in the prepolymer composition, addition of the polymerization initiator for postpolymerization may be omitted.

The polymerization method for postpolymerization is not particularly limited, and may be identical to or different from the method for polymerizing the prepolymer. When polymerization of the prepolymer is performed by photopolymerization, it is preferable that postpolymerization is also performed by photopolymerization. In particular, for preparing a solvent-free pressure sensitive adhesive composition which does not substantially contain a solvent, photopolymerization is suitable. The polymerization ratio of the reaction product after postpolymerization is preferably 94% or more, more preferably 97% or more, further preferably 99% or more.

The base polymer after postpolymerization has a large molecular weight and a high viscosity, and therefore may be difficult to apply on a substrate. Thus, when the pressure sensitive adhesive sheet is formed, it is preferable that a curable pressure sensitive adhesive composition containing a prepolymer composition and a urethane (meth)acrylate is prepared, and the pressure sensitive adhesive composition is applied in a layer form onto a substrate, followed by performing postpolymerization as described later.

[Pressure Sensitive Adhesive Composition]

The pressure sensitive adhesive may be a pressure sensitive adhesive composition containing a polymer or oligomer other than the base polymer, various additives and so on in addition to the base polymer.

(Oligomer)

The pressure sensitive adhesive composition may contain oligomers for the purpose of, for example, adjusting the adhesive strength and the viscosity. As the oligomer, one having a weight average molecular weight of, for example, about 1000 to 30000 is used. The oligomer is preferably an acryl-based oligomer because it is excellent in compatibility with the acryl-based base polymer.

The acryl-based oligomer contains a (meth)acrylic acid alkyl ester as a main constituent monomer component. In particular, the acryl-based oligomer is preferably one containing as a constituent monomer component a (meth)acrylic acid alkyl ester having a linear or branched alkyl group (linear or branched alkyl (meth)acrylate) and a (meth)acrylic acid alkyl ester having a cycloaliphatic alkyl group (cycloaliphatic alkyl (meth)acrylate). Specific examples of the linear or branched alkyl (meth)acrylate and the cycloaliphatic alkyl (meth)acrylate are as shown above as constituent monomers of the acryl-based segment.

The glass transition temperature of the acryl-based oligomer is preferably 20° C. or higher, more preferably 30° C. or higher, further preferably 40° C. or higher. When a base polymer which has a low glass transition temperature (Tg) and in which a crosslinked structure is introduced by a urethane-based segment, and an acryl-based oligomer having a high glass transition temperature (Tg) are used in combination, the high-temperature retaining force of the pressure sensitive adhesive tends to be improved. The upper limit of the glass transition temperature of the acryl-based oligomer is not particularly limited, but is generally 200° C. or lower, preferably 180° C. or lower, more preferably 160° C. or lower. The glass transition temperature of the acryl-based oligomer is calculated in accordance with the Fox equation.

Among the shown (meth)acrylic acid alkyl esters, the linear or branched alkyl (meth)acrylate is preferably methyl methacrylate because it has a high glass transition temperature, and is excellent in compatibility with the base polymer. As the cycloaliphatic alkyl (meth)acrylate, dicyclopentanyl acrylate, dicyclopentanyl methacrylate, cyclohexyl acrylate and cyclohexyl methacrylate are preferable. That is, the acryl-based oligomer is preferably one containing as constituent monomer components at least one selected from the group consisting of dicyclopentanyl acrylate, dicyclopentanyl methacrylate, cyclohexyl acrylate and cyclohexyl methacrylate, and methyl methacrylate.

The amount of the cycloaliphatic alkyl (meth)acrylate based on the total amount of monomer components for forming the acryl-based oligomer is preferably 10 to 90% by weight, more preferably 20 to 80% by weight, further preferably 30 to 70% by weight. The amount of the linear or branched alkyl (meth)acrylate based on the total amount of monomer components for forming the acryl-based oligomer is preferably 10 to 90% by weight, more preferably 20 to 80% by weight, further preferably 30 to 70% by weight.

The weight average molecular weight of the acryl-based oligomer is preferably 1000 to 30000, more preferably 1500 to 10000, further preferably 2000 to 8000. When an acryl-based oligomer having a molecular weight falling within the above-mentioned range is used, the adhesive strength and the high-temperature retaining force of the pressure sensitive adhesive tend to be improved.

The acryl-based oligomer is obtained by polymerizing the above-mentioned monomer components by various polymerization methods. In polymerization of the acryl-based oligomer, various polymerization initiators may be used. In addition, a chain-transfer agent may be used for the purpose of adjusting the molecular weight.

When the pressure sensitive adhesive composition contains an oligomer component such as an acryl-based oligomer, the content of the oligomer component is preferably 0.5 to 20 parts by weight, more preferably 1 to 15 parts by weight, further preferably 2 to 10 parts by weight based on 100 parts by weight of the base polymer. When the content of the oligomer in the pressure sensitive adhesive composition is within the above-mentioned range, adhesiveness at a high temperature and the retaining force at a high temperature tend to be improved.

(Silane Coupling Agent)

A silane coupling agent can also be added in the pressure sensitive adhesive composition for the purpose of adjusting the adhesive strength. When the pressure sensitive adhesive composition includes a silane coupling agent, the content thereof is normally about 0.01 to 5.0 parts by weight, preferably 0.03 to 2.0 parts by weight based on 100 parts by weight of the base polymer.

(Crosslinker)

The base polymer may have a crosslinked structure formed by other than that of the above-mentioned polyfunctional compound as necessary. The crosslinked structure can be introduced in the base polymer by adding a crosslinker into the pressure sensitive adhesive composition. The crosslinker can form a crosslinked structure by reacting with a functional group, such as a hydroxyl group and a carboxy group introduced into the base polymer. Specific examples of the crosslinker include isocyanate-based crosslinkers, epoxy-based crosslinkers, oxazoline-based crosslinkers, aziridine-based crosslinkers, carbodiimide-based crosslinkers and metal chelate-based crosslinkers.

As described above, the low-temperature adhesive strength of the pressure sensitive adhesive may decrease when the amount of the crosslinked structure introduced by components other than the urethane-based segment is increased. Thus, the amount of the crosslinker is preferably 3 parts by weight or less, more preferably 2 parts by weight or less, further preferably 1 part by weight or less based on 100 parts by weight of the base polymer.

(Other Additives)

In addition to the components exemplified above, additives such as a tackifier, a plasticizer, a softener, a degradation inhibitor, a filler, a colorant, an ultraviolet ray absorber, an antioxidant, a surfactant and an antistatic agent maybe contained in the pressure sensitive adhesive composition.

<Preparation of Pressure Sensitive Adhesive Composition>

A pressure sensitive adhesive composition can be prepared by mixing the above-described components, and a solvent as necessary. When the pressure sensitive adhesive sheet is formed, it is preferable that the pressure sensitive adhesive composition has a viscosity (e.g., about 0.5 to 20 Pa·s) suitable for application of the composition onto a substrate. When the pressure sensitive adhesive composition is a solution, the viscosity of the composition can be adjusted to fall within an appropriate range by adjusting the molecular weight of the polymer, the solid content of the solution, and so on.

A base polymer in which a crosslinked structure is introduced by a urethane-based segment tends to have a large molecular weight, and an increased solution viscosity. In addition, the solvent-free pressure sensitive adhesive composition has a high viscosity, and therefore may be difficult to apply onto a substrate after introduction of a crosslinked structure. Thus, when the pressure sensitive adhesive sheet is formed, it is preferable that a curable pressure sensitive adhesive composition containing a prepolymer composition and a urethane (meth)acrylate is prepared, and the pressure sensitive adhesive composition is applied in a layer form onto a substrate, followed by performing postpolymerization.

As described above, the curable pressure sensitive adhesive composition may contain the remainder of a monomer component for forming the acryl-based segment, a polymerization initiator, a chain-transfer agent, other additives and so on in addition to the prepolymer composition and the urethane (meth)acrylate. The curable pressure sensitive adhesive composition may contain the oligomer, a silane coupling agent, a crosslinker and so on.

The viscosity of the pressure sensitive adhesive composition can be adjusted to fall within an appropriate range by adjusting the polymerization ratio of the prepolymer, the added amount of the urethane (meth)acrylate, the added amount of the oligomer and so on. In the pressure sensitive adhesive composition, additives such as thickener may be used for the purpose of, for example, adjusting the viscosity.

[Pressure Sensitive Adhesive Sheet]

A pressure sensitive adhesive sheet is formed by depositing the pressure sensitive adhesive composition into a sheet. When the pressure sensitive adhesive composition is curable, the composition is applied onto a substrate, and then subjected to postpolymerization on the substrate by heating, active ray irradiation etc. to obtain a pressure sensitive adhesive sheet composed of a pressure sensitive adhesive in which a crosslinked structure is introduced into an acryl-based segment by a urethane-based segment.

The thickness of the pressure sensitive adhesive sheet is not particularly limited, and may be appropriately set according to, for example, the type of an adherend. The thickness of the pressure sensitive adhesive sheet is, for example, about 5 to 500 From the viewpoint of securing both adhesiveness to an adherend and uniformity of the thickness, the thickness of the pressure sensitive adhesive sheet is preferably 10 to 400 μm, more preferably 15 to 350 μm.

For applying the pressure sensitive adhesive composition on the substrate, various kinds of coating methods such as roll coating, kiss roll coating, gravure coating, reverse coating, roll brushing, spray coating, dip roll coating, bar coating, knife coating, air knife coating, curtain coating, lip coating, and extrusion coating may be employed.

When the pressure sensitive adhesive composition is a solution, it is preferable to dry the solution after application of the pressure sensitive adhesive composition. As a drying method, drying by heating is preferable. The temperature of drying by heating is preferably 40° C. to 200° C., more preferably 50° C. to 180° C., especially preferably 70° C. to 170° C. As a drying time, a suitable time can be appropriately employed. The drying time is preferably 5 seconds to 20 minutes, more preferably 5 seconds to 15 minutes, especially preferably 10 seconds to 10 minutes.

When the pressure sensitive adhesive composition is photocurable, the pressure sensitive adhesive composition applied onto a substrate is irradiated with an active ray to be photocured. At the time of performing photocuring, it is preferable that a cover sheet is disposed over the surface of the coating layer, and the pressure sensitive adhesive composition is irradiated with an active ray while being held between two sheets, so that hindrance of polymerization by oxygen is prevented.

The active ray may be selected according to the type of a polymerizable component such as a monomer or urethane (meth)acrylate, the type of a photopolymerization initiator or the like, and in general, an ultraviolet ray and/or visible light having a short wavelength are used. The accumulated amount of irradiation light is preferably about 100 to 5000 mJ/cm$^2$. The light source for photoirradiation is not particularly limited as long as it can emit light in a wavelength range over which the photopolymerization initiator contained in the pressure sensitive adhesive composition is sensitive to light, and a LED light source, a high-pressure mercury lamp, an ultra-high mercury lamp, a metal halide lamp, a xenon lamp or the like is preferably used.

For each of the substrate and cover sheet to be used for formation of the pressure sensitive adhesive sheet, any suitable material is used. Each of the substrate and the cover sheet may be a release film having a release layer on a contact surface with the pressure sensitive adhesive sheet.

FIG. 1 is a sectional view showing an example of a configuration of a release film-equipped pressure sensitive adhesive sheet in which release films 1 and 2 are temporarily attached, respectively, to both surfaces of a pressure sensitive adhesive sheet 5. The release films 1 and 2 are used for the purpose of protecting the surfaces of the pressure sensitive adhesive sheet until the pressure sensitive adhesive sheet 5 is used for bonding to an adherend. Preferably, release films 1 and 2 have release layers 11 and 21 on surfaces of base films 10 and 20 (surface to be contact to the pressure sensitive adhesive sheet 5), respectively.

As the base film of the release film, films composed of various resin materials are used. Examples of the resin material include polyester-based resins such as polyethylene terephthalate and polyethylene naphthalate, acetate-based resins, polyether sulfone-based resins, polycarbonate-based resins, polyamide-based resins, polyimide-based resins, polyolefin-based resins, (meth)acryl-based resins, polyvinyl chloride-based resins, polyvinylidene chloride-based resins, polystyrene-based resins, polyvinyl alcohol-based resins, polyacrylate-based resins and polyphenylene sulfide-based resins. Among them, polyester-based resins such as polyethylene terephthalate are especially preferable.

The thickness of the base film is preferably 10 to 200 μm, more preferably 25 to 150 μm. When release films 1 and 2 are disposed on both surfaces of the pressure sensitive adhesive sheet 5, the thickness of one release film 1 and the thickness of the other release film 2 may be the same, or different. When the pressure sensitive adhesive composition is applied to the release film as a substrate, and then photocured by irradiating the pressure sensitive adhesive composition with an active ray through the release film, the release film provided on the photoirradiation surface is preferably transparent.

Examples of the material of the release layer include silicone-based release agents, fluorine-based release agents, long-chain alkyl-based release agents and aliphatic amide-based release agents. The thickness of the release layer is generally about 10 to 2000 nm. The peeling strength of the release films 1 and 2 from the pressure sensitive adhesive layer 5 can be adjusted by changing the type of release agent and the thickness of the release layer.

The peeling strength in peeling of the first release film 1 from the pressure sensitive adhesive sheet 5 and the peeling strength in peeling of the second release film 2 from the pressure sensitive adhesive sheet 5 may be the same or different. When the peeling strength of the release film on one surface is different from the peeling strength of the release film on the other surface, excellent workability can be attained by performing the bonding of adherends in the following procedure: the release film 2 with relatively small peeling strength is first peeled from the pressure sensitive adhesive sheet 5, and bonded to a first adherend, and the release film 1 with relatively large peeling strength is peeled, and bonded to a second adherend.

As the release films 1 and 2, the substrate or cover sheet used during formation of the pressure sensitive adhesive sheet (application of the pressure sensitive adhesive) may be used as such, or replaced by other release film.

Figure 2:
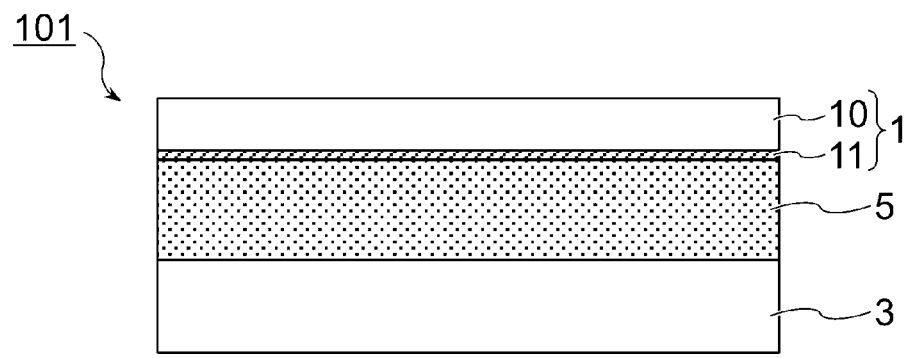
FIG. 2 is a sectional view showing a usage example of a pressure sensitive adhesive sheet.

FIG. 2 is a sectional view showing an example of a configuration of an adherend sheet-equipped pressure sensitive adhesive sheet in which an adherend sheet 3 is attached on one surface of the pressure sensitive adhesive sheet 5, and the release film 1 is temporarily attached on the other surface of the pressure sensitive adhesive sheet 5. By peeling the release film 1 temporarily attached on a surface of the pressure sensitive adhesive sheet 5, and then bonding the exposed surface of the pressure sensitive adhesive sheet 5 to an adherend, the adherend sheet can be attached to a surface of the adherend with the pressure sensitive adhesive sheet 5 interposed therebetween. The type of the adherend sheet 3 is not particularly limited, and it may be a transparent film, a decorative film, a glass plate or the like.

In formation of the adherend sheet-equipped pressure sensitive adhesive sheet as shown in FIG. 2, for example, one release film 2 may be peeled from the release film-equipped pressure sensitive adhesive sheet as shown in FIG. 1, followed by bonding the exposed surface of the pressure sensitive adhesive sheet 5 to the adherend sheet 3. One of the substrate and the cover sheet which are used during formation (application) of the pressure sensitive adhesive sheet may be remain attached to the pressure sensitive adhesive to be used as the adherend sheet 3.

<Physical Properties of Pressure Sensitive Adhesive Sheet>

The pressure sensitive adhesive sheet may have both adhesiveness at a low temperature and an adhesion retaining force at a high temperature, because the base polymer of the pressure sensitive adhesive includes an acryl-based segment and a urethane-based segment.

Preferably, the pressure sensitive adhesive sheet does not fall from an adherend even after elapse of 2 hours in a high-temperature retaining force test conducted under the condition of a temperature of 100° C. and a load of 1000 g. In addition, the peeling strength in a 180° peeling test conducted under the condition of a temperature of 5° C. and a peel rate of 300 mm/minute is preferably 5 N/10 mm or more, more preferably 6 N/10 mm or more, further preferably 7 N/10 mm or more.

From the viewpoint of increasing adhesive strength at a low temperature, the glass transition temperature of the pressure sensitive adhesive sheet is preferably 0° C. or lower. On the other hand, when the glass transition temperature is excessively low, the retaining force at a high temperature tends to be reduced, and therefore the glass transition temperature of the pressure sensitive adhesive sheet is preferably −25° C. or higher, more preferably −20° C. or higher, further preferably −15° C. or higher. The glass transition temperature of the pressure sensitive adhesive sheet is a loss tangent (tan δ) peak-top temperature in dynamic viscoelasticity measurement (frequency: 1 Hz).

From the viewpoint of increasing the retaining force at a high temperature, the shear storage elastic modulus of the pressure sensitive adhesive sheet at a temperature of 25° C. ($G'_{25°\,C.}$) is preferably 0.05 MPa or more, more preferably 0.10 MPa or more, further preferably 0.13 MPa or more, especially preferably 0.15 MPa. In addition, the shear storage elastic modulus of the pressure sensitive adhesive sheet at a temperature of 80° C. ($G'_{80°\,C.}$) is preferably 0.01 MPa or more, more preferably 0.03 MPa or more, further preferably 0.05 MPa or more.

The upper limit of each of the shear storage elastic moduli $G'_{25°\,C.}$ and $G'_{80°\,C.}$ is not particularly limited from the viewpoint of the adhesion retaining force. For imparting moderate viscidity and wettability to the pressure sensitive adhesive sheet, the shear storage elastic modulus $G'_{25°\,C.}$ is preferably 3 MPa or less, more preferably 1 MPa or less, further preferably 0.5 MPa or less. From the same viewpoint as described above, the shear storage elastic modulus $G'_{80°\,C.}$ is preferably 0.3 MPa or less, more preferably 0.25 MPa or less.

From the viewpoint of securing both the retaining force at a high temperature and adhesiveness at a low temperature, the product of the glass transition temperature Tg (° C.) of the pressure sensitive adhesive sheet and the shear storage elastic modulus $G'_{25°\,C.}$ (MPa) of the pressure sensitive adhesive sheet at a temperature of 25° C. is preferably −1 or less, more preferably −3 or less, further preferably −4 or less.

<Use of Pressure Sensitive Adhesive Sheet>

The pressure sensitive adhesive sheet can be used for bonding various transparent members and opaque members. The type of the adherend is not particularly limited, and examples thereof include various resin materials, glass and metals. In particular, the pressure sensitive adhesive sheet may have both adhesive strength at a low temperature and an adhesion retaining force at a high temperature, and is therefore suitably used for bonding of members, decoration of the surface and so on in, for example, equipment that is used over a wide temperature range from a low temperature to a high temperature. In addition, the pressure sensitive adhesive sheet is suitably used for bonding of members in image display devices such as liquid crystal displays and organic EL displays and input devices such as touch panels.

EXAMPLES

Examples and comparative examples are shown below, but the present invention is not limited to these examples.

[Preparation of Acrylic Oligomer]

60 parts by weight of dicyclopentanyl methacrylate (DCPMA), 40 parts by weight of methyl methacrylate (MMA), 3.5 parts by weight of α-thioglycerol as a chain-transfer agent, and 100 parts by weight of toluene as a polymerization solvent were mixed, and stirred in a nitrogen atmosphere at 70° C. for 1 hour. 0.2 parts by weight of 2,2'-azobisisobutyronitrile (AIBN) is added as a thermopolymerization initiator, and the mixture was reacted at 70° C. for 2 hours, then heated to 80° C., and reacted for 2 hours. Thereafter, the reaction liquid was heated to 130° C., and toluene, the chain-transfer agent and unreacted monomers were removed by drying to obtain a solid acrylic oligomer. The weight average molecular weight of the acrylic oligomer was 5100.

Example 1

(Polymerization of Prepolymer)

52.8 parts by weight of butyl acrylate (BA), 10.9 parts by weight of cyclohexyl acrylate (CHA), 9.7 parts by weight of N-vinyl-2-pyrrolidone (NVP), 14.8 parts by weight of 4-hydroxybutyl acrylate (4HBA) and 11.8 parts by weight of isostearyl acrylate (ISTA) as prepolymer forming monomer components, and photopolymerization initiators (0.035 parts by weight of "IRGACURE 184" manufactured by BASF SE and 0.035 parts by weight of "IRGACURE 651" manufactured by BASF SE) were blended, and the mixture was irradiated with an ultraviolet ray to a viscosity of about 20 Pa·s (BH viscometer No. 5 Rotor, 10 rpm, measurement temperature: 30° C.), so that the mixture was polymerized to obtain a prepolymer composition (polymerization ratio: about 9%).

(Preparation of Photocurable Pressure Sensitive Adhesive Composition)

The following materials are added to the prepolymer composition: 7 parts by weight of a terminally acrylic-modified polyether urethane ("UV-3300B" manufactured by The Nippon Synthetic Chemical Industry Co., Ltd.) and 3 parts by weight of a terminally acrylic-modified polyether urethane ("UV-3010B" manufactured by The Nippon Synthetic Chemical Industry Co., Ltd.) as urethane (meth)acrylates; 5 parts by weight of the acrylic oligomer; 0.05 parts by weight of IRGACURE 184 and 0.57 parts by weight of IRGACURE 651 as photopolymerization initiators; 0.2 parts by weight of an α-methylstyrene dimer ("NOFMER MSD" manufactured by NOF CORPORATION) as a chain-transfer agent; and 0.3 parts by weight of "KBM 403" manufactured by Shin-Etsu Chemical Co., Ltd. as a silane coupling agent. The mixture was then heterogeneously mixed to prepare a pressure sensitive adhesive composition.

(Preparation of Pressure Sensitive Adhesive Sheet)

On a 50 μm-thick polyethylene terephthalate (PET) film having a silicone-based release layer on a surface thereof ("DIAFOIL MRF50" manufactured by Mitsubishi Chemical Corporation), the photocurable pressure sensitive adhesive composition was applied in a thickness of 150 μm to form a coating layer. A 38 μm-thick PET film with one surface subjected to silicone release treatment ("DIAFOIL MRF38" manufactured by Mitsubishi Chemical Corporation) was bonded onto a surface of the coating layer. By a black light, which was position-adjusted so that the irradiation intensity at an irradiation surface just below the lamp was 5 mW/cm², the laminate was irradiated with an ultraviolet ray from the 38 μm-thick PET film-side for 300 seconds to photocure the pressure sensitive adhesive composition. Thereafter, drying treatment was performed in a dryer at 90° C. for 2 minutes to volatilize remaining monomers, thereby obtaining a pressure sensitive adhesive sheet having a thickness of 150 μm.

Examples 2 to 4 and Comparative Examples 1 to 5

The compositions of charged monomers in polymerization of the prepolymer, and the types and added amounts of the polyfunctional compound (urethane acrylate and/or polyfunctional acrylate), acrylic oligomer, photopolymerization initiator, chain-transfer agent and silane coupling agent added to the pressure sensitive adhesive composition were changed as shown in Table 1. In the same manner as in Example 1 except for the above, the photocurable pressure sensitive adhesive composition was prepared. Thus obtained photocurable pressure sensitive adhesive composition was applied onto the substrate and photocured, and then volatilization of remaining monomers by drying was performed as in Example 1 to obtain a pressure sensitive adhesive sheet.

In Table 1, the components are represented by the following abbreviations.

<Acryl-Based Monomer>
BA: butyl acrylate
2HEA: 2-ethylhexyl acrylate
CHA: cyclohexyl acrylate
NVP: N-vinyl-2-pyrrolidone
4HBA: 4-hydroxybutyl acrylate
ISTA: isostearyl acrylate
INA: isinonyl acrylate
AA: acrylic acid
2MEA: 2-methoxyethyl acrylate
HEAR: hydroxyethyl acrylamide <Urethane Acrylate>
UN-350: "ART RESIN UN-350" manufactured by Negami Chemical Industrial Co., Ltd. (polyester urethane diacrylate having a weight average molecular weight of about 12500 and a glass transition temperature of −57° C.)
UV-3300B: "UV-3300B" manufactured by The Nippon Synthetic Chemical Industry Co., Ltd. (polyether urethane diacrylate having a weight average molecular weight of about 12000 and a glass transition temperature of −30° C.)
UV-3010B: "UV-3010B" manufactured by The Nippon Synthetic Chemical Industry Co., Ltd. (polyester urethane diacrylate having a weight average molecular weight of about 11000)
UN-9200A: "ART RESIN UN-9200A" manufactured by Negami Chemical Industrial Co., Ltd. (polycarbonate urethane diacrylate having a weight average molecular weight of about 15000 and a glass transition temperature of −27° C.)

<Polyfunctional Acrylate>
  HDDA: hexanediol diacrylate
<Photopolymerization Initiator>
  Irg651: IRGACURE 651 (2,2-dimethoxy-1,2-diphenylethane-1-one)
  Irg184: IRGACURE 184 (1-hydroxy-cyclohexyl-phenyl-ketone)
[Evaluation]
<Weight Average Molecular Weight>
The weight average molecular weights (Mw) of the acrylic oligomer and urethane (meth)acrylate were measured by a GPC (gel permeation chromatography) apparatus (product name "HLC-8120GPC") manufactured by TOSOH CORPORATION. The base polymer was dissolved in tetrahydrofuran to prepare a 0.1 wt % solution, this solution was filtered with a 0.45 µm membrane filter, and the resulting filtrate was used as a measurement sample. GPC measurement conditions are as follows.
(Measurement Conditions)
  Column: G7000HXL+GMHXL+GMHXL manufactured by TOSOH CORPORATION
  Column size: each 7.8 mmφ×30 cm (total column length: 90 cm)
  Column temperature: 40° C., Flow rate: 0.8 mL/min
  Injection amount: 100 µL
  Eluent: tetrahydrofuran
  Detector: differential refractometer (RI)
  Standard sample: polystyrene
<Storage Elastic Modulus and Glass Transition Temperature of Pressure Sensitive Adhesive Sheet>
Ten pressure sensitive adhesive sheets were laminated to a thickness of about 1.5 mm, and the laminate thus obtained was used as a sample for measurement. The dynamic viscoelasticity was measured under the following conditions using "Advanced Rheometric Expansion System (ARES)" manufactured by Rheometric Scientific, Inc.
(Measurement Conditions)
  Deformation mode: torsion
  Measurement Frequency: 1 Hz
  Temperature elevation rate: 5° C./minute
  Shape: parallel plate (7.9 mmφ)

The shear storage elastic modulus was determined by reading a storage elastic modulus G' at each temperature from the measurement result. The temperature at which the loss tangent (tan δ) was maximum (peak-top temperature) was defined as a glass transition temperature of the pressure sensitive adhesive sheet.
<High-Temperature Retaining Force>
The retaining force of the pressure sensitive adhesive sheet at 100° C. was evaluated by a creep test in accordance with JIS Z 0237. One release film was peeled from the pressure sensitive adhesive sheet, and the pressure sensitive adhesive sheet was bonded to a PET film having a thickness of 25 µm, and cut to a width of 10 mm to prepare a test piece. The other release film was peeled from the test piece, and the test piece was bonded to a Bakelite plate with a contact area of 10 mm (width)×20 mm (length). This was held at 100° C. for 30 minutes, the Bakelite plate was then suspended, and a load of 1000 g was applied to the test piece at a free end (a portion which was not bonded to the Bakelite plate). The test piece was left standing under an environment at 80° C. for 2 hours with the load applied thereto, and a displacement (mm) of the test piece from the initial bonding position after elapse of 2 hours. When the test piece fell down within 2 hours (the displacement was more than 20 mm), the time until the test piece fell down was recorded.
<Low-Temperature Adhesive Strength>
As an adherend, a clean acrylic plate cleaned by scrubbing the acrylic plate 10 times in a reciprocating manner with a clean cloth impregnated with isopropyl alcohol. One release film was peeled from the pressure sensitive adhesive sheet, and the pressure sensitive adhesive sheet was bonded to a PET film having a thickness of 50 µm, and cut to a width of 10 mm and a length of 100 mm to prepare a test piece. The other release film was peeled from the test piece, and the test piece was press-bonded to the adherend with a 5 kg roller, and then held under an environment at 5° C. for 30 minutes. Thereafter, using a tensile tester, a test piece was peeled from the acrylic plate under the condition of a tension speed of 300 mm/minute and a peeling angle of 180° to measure the peeling strength.
<Evaluation Results>
Compositions and evaluation results for the pressure sensitive adhesive sheets are shown in Table 1.

TABLE 1

| | | Example 1 | Example 2 | Example 3 | Example 4 | Comparative Example 1 | Comparative Example 2 | Comparative Example 3 | Comparative Example 5 | Comparative Example 5 |
|---|---|---|---|---|---|---|---|---|---|---|
| prepolymer composition | BA | 52.8 | 52.8 | 53.2 | 65.4 | 52.8 | 52.8 | — | — | — |
| | 2EHA | — | — | — | — | — | — | — | 80.0 | 80.0 |
| | CHA | 10.9 | 10.9 | 10.9 | — | 10.9 | 10.9 | — | — | — |
| | NVP | 9.7 | 9.7 | 9.0 | 16.1 | 9.7 | 9.7 | — | 7.0 | 7.0 |
| | 4HBA | 14.8 | 14.8 | 14.9 | 18.5 | 14.8 | 14.8 | — | — | — |
| | ISTA | 11.8 | 11.8 | 11.9 | — | 11.8 | 11.8 | — | — | — |
| | INA | — | — | — | — | — | — | 90.0 | — | — |
| | AA | — | — | — | — | — | — | 10.0 | — | — |
| | 2MEA | — | — | — | — | — | — | — | 11.5 | 11.5 |
| | HEAA | — | — | — | — | — | — | — | 1.5 | 1.5 |
| urethane diacrylate | UN-350 | — | — | 5 | 5 | — | — | — | — | — |
| | UV-3300B | 7 | 5 | 5 | — | 1 | 40 | — | — | — |
| | UV-3010B | 3 | — | — | — | — | — | — | — | — |
| | UN-9200A | — | 5 | — | — | — | — | — | — | — |
| polyfunctional acrylate | HDDA | — | — | — | — | — | — | 3 | 3 | 0.1 |
| | acrylic oligomer | 5 | 5 | 5 | 5 | 5 | 5 | — | — | — |
| photo-polymerization initiator | Irg651 | 0.57 | 0.57 | 0.57 | 0.55 | 0.55 | 0.55 | 0.10 | 0.05 | 0.05 |
| | Irg184 | 0.05 | 0.07 | 0.05 | 0.05 | 0.05 | 0.05 | 0.10 | 0.05 | 0.05 |
| chain-transfer agent | NOFMER MSD | 0.2 | 0.2 | 0.2 | 0.2 | 0.2 | 0.2 | — | — | — |

TABLE 1-continued

| | | Example 1 | Example 2 | Example 3 | Example 4 | Comparative Example 1 | Comparative Example 2 | Comparative Example 3 | Comparative Example 5 | Comparative Example 5 |
|---|---|---|---|---|---|---|---|---|---|---|
| silane coupling agent | KBM-403 | 0.3 | 0.3 | 0.3 | 0.3 | 0.3 | 0.3 | — | — | — |
| | Tg (° C.) | −5.0 | −4.1 | −5.0 | −5.0 | −3.5 | ≥−10 | −7.0 | ≥−20 | ≥−20 |
| | $G_{25°C}'$ (MPa) | 0.21 | 0.18 | 0.20 | 0.21 | 0.17 | 0.57 | 0.36 | 0.35 | 0.06 |
| | $G_{80°C}'$ (MPa) | 0.14 | 0.08 | 0.11 | 0.05 | 0.02 | 0.69 | 0.37 | 0.04 | 0.03 |
| High-temperature retaining force (mm) | | 0.2 | 0.5 | 0.2 | 0.2 | (0分) | 0.1 | 0.1 | 0.1 | (10分) |
| Adhesive strength at 5° C. (N/10 mm) | | 8.8 | 12.3 | 9.5 | 9.6 | 14.8 | 3.6 | 4.7 | 0.25 | 5.1 |

The pressure sensitive adhesive sheet of Comparative Example 3 in which a crosslinked structure was introduced into the acryl-based polymer chain by a polyfunctional acrylate was excellent in adhesion retaining force at a high temperature, but had insufficient adhesive strength at 5° C. The pressure sensitive adhesive sheet of Comparative Example 4 in which the composition of the acryl-based polymer chain was adjusted to lower the glass transition temperature Tg had further reduced adhesive strength at 5° C. The pressure sensitive adhesive sheet of Comparative Example 5 in which the introduction amount of the polyfunctional acrylate was decreased to increase viscosity had improved adhesive strength at 5° C., but had a low storage elastic modulus and a poor retaining force at a high temperature. These results show that in a pressure sensitive adhesive sheet using a polymer in which a crosslinked structure is introduced by a polyfunctional acrylate, it is difficult to satisfy both low-temperature adhesiveness and high-temperature retaining force.

It is apparent that the pressure sensitive adhesive sheets of Examples 1 to 3 in which a crosslinked structure is introduced into the acryl-based polymer chain by a urethane diacrylate are excellent in retaining force at a high temperature and adhesive strength at 5° C., and thus applicable over a wide temperature range.

The pressure sensitive adhesive sheet of Comparative Example 1 in which the amount of the urethane diacrylate was 1 part by weight based on 100 parts by weight of the total of monomer components for forming the acryl-based polymer chain had a higher glass transition temperature and a lower storage elastic modulus as compared to the pressure sensitive adhesive sheets of Examples 1 and 2. As a result, the retaining force at a high temperature was reduced, and the test piece fell down just after application of a load in the high-temperature retaining force test.

On the other hand, the pressure sensitive adhesive sheet of Comparative Example 2 in which the use amount of the urethane diacrylate was 40 parts by weight had a lower glass transition temperature and a higher storage elastic modulus as compared to the pressure sensitive adhesive sheets of Examples 1 and 2. Accordingly, the displacement in the high-temperature retaining test was reduced, and the retaining force at a high temperature was improved, but adhesiveness at a low temperature was insufficient.

The above results show that when a base polymer containing an acryl-based segment and a urethane-based segment is used, and the introduction amount of the urethane-based segment is adjusted, it is possible to satisfy both adhesive strength at a low temperature and a retaining force at a high temperature, which is difficult in the case of using a base polymer in which a crosslinked structure is introduced by a polyfunctional acrylate.

What is claimed is:

1. A pressure sensitive adhesive comprising an acryl-based base polymer, wherein
    the acryl-based base polymer contains an acryl-based segment and a urethane-based segment, and
    a content of the urethane-based segment is 3 to 20 parts by weight based on 100 parts by weight of the acryl-based segment.

2. The pressure sensitive adhesive according to claim 1, wherein a weight average molecular weight of the urethane-based segment is 3000 to 50000.

3. The pressure sensitive adhesive according to claim 1, wherein the urethane-based segment includes at least one polymer chain selected from the group consisting of a polyether chain, a polyester chain, a polycarbonate chain.

4. The pressure sensitive adhesive according to claim 1, wherein a glass transition temperature of the urethane-based segment is 0° C. or lower.

5. The pressure sensitive adhesive according to claim 1, wherein in the acryl-based base polymer, the acryl-based segment is crosslinked with the urethane-based segment.

6. The pressure sensitive adhesive according to claim 1, wherein a content of the acryl-based base polymer in the pressure sensitive adhesive is 50% by weight or more.

7. The pressure sensitive adhesive according to claim 1, further comprising an acryl-based oligomer having a weight average molecular weight of 1000 to 30000.

8. The pressure sensitive adhesive according to claim 1, wherein a glass transition temperature of the pressure sensitive adhesive is −25° C. to 0° C.

9. A pressure sensitive adhesive sheet, wherein the pressure sensitive adhesive according to claim 1 is formed in a sheet shape.

10. The pressure sensitive adhesive sheet according to claim 9, wherein a shear storage elastic modulus of the pressure sensitive adhesive sheet at a temperature of 25° C. is 0.15 to 0.30 MPa.

11. The pressure sensitive adhesive sheet according to claim 9, wherein a product of the glass transition temperature (° C.) of the pressure sensitive adhesive sheet and the shear storage elastic modulus (MPa) of the pressure sensitive adhesive sheet at a temperature of 25° C. is −1.0 or less.

* * * * *